Nov. 2, 1926.
A. E. BRONSON
1,605,213
CLOSURE MEMBER FOR THE END OF A VALVE STEM
Filed Oct. 29, 1921
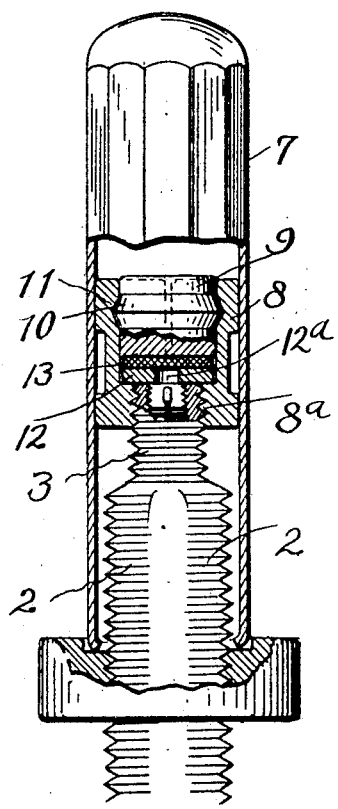
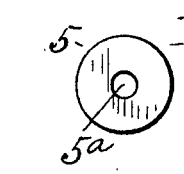
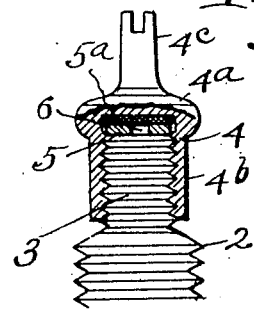
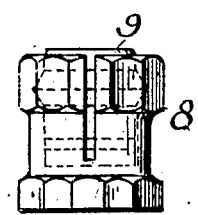
Inventor
Adelbert E. Bronson
Thurston Kwis & Hudson
attys Patented Nov. 2, 1926.

1,605,213

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

CLOSURE MEMBER FOR THE END OF A VALVE STEM.

Application filed October 29, 1921. Serial No. 511,253.

The present invention relates to a construction which is particularly adapted to be used in connection with a device which cooperates with a valve stem such as used for pneumatic tires or similar devices wherein a packing is introduced at the end of the valve stem in order to seal the ends of the valve stem and prevent the leakage of air therefrom in the event that the valve insides, which are usually employed in the valve stem, should be somewhat displaced.

The present invention is useful as forming a part of the usual valve stem cap which is now universally employed or may be used in connection with dust caps which carry provisions for engaging with the end of the valve stem in order to secure the dust cap in position on the valve stem.

Reference should be had to the accompanying drawings forming a part of this specification, in which Fig. 1 is an elevation with portions in section showing a valve cap on the end of a valve stem; Fig. 2 is an elevation with portions in section showing a valve stem with a dust cap therefor and provisions within the dust cap by which the dust cap is secured to the valve stem; Fig. 3 is a plan view of a packing member and Fig. 4 is a plan view of a second packing member; Fig. 5 is a side elevation of the valve cap shown in Fig. 2.

Referring to the drawings, and more particularly to Fig. 1, the valve stem is indicated at 2, and is provided with the usual threaded extension or nipple 3 which is adapted to receive a valve cap which is generally indicated at 4. This valve cap in its general construction is quite the same as that which is now employed, that is to say, having a head portion 4ª with a depending flange or skirt 4ᵇ which is interiorly threaded and the head 4ª having an extension 4ᶜ which is slotted to provide the usual screw driven provision.

It has been customary heretofore to use a packing member within the valve cap which is adapted to engage with the end of the valve stem to prevent the escape of air from the valve stem in the event that the valve insides within the valve stem leak.

In the present case the packing members consist of an annular disk-like member 5 which is made of a relatively hard material and a disk 6 which is made of relatively soft material.

In speaking of the disk 5 as of relatively hard material, it is intended to include all material which when engaged by the end of the valve stem 3 may slightly compress the material forming the disk 5 so as to seal the escape of air from between the disk 5 and the end of the valve stem. A material which has been found to be very advantageous for this purpose is fibre.

The disk 6 is made of a softer material and one which may be compressed as the valve cap is screwed on the end of the valve stem. Rubber has been found to very advantageously fulfill the requirements.

The disk 5 is provided with a central opening 5ª which is provided to accommodate the end of the stem of the valve insides to the same extent beyond the top of the valve stem, as is frequently the case. This disk 5 being of material which is not easily compressed will not be materially distorted when pressure is applied to the disk 5 in seating the cap, and therefore the opening 5ª will remain intact so that the stem of the valve insides will not be interfered with.

The disk 6 is imperforate and engages with the inner wall of the head 4ª so that when pressure is applied in seating the cap 4, the disk 6 will be compressed and seal the opening 5ª so that air can not escape between the disk 5 and the disk 6.

There is thus provided an efficient air tight packing for the end of the valve stem and one which provides for the extension of the stem of the valve insides beyond the end of the valve stem.

The disks 5 and 6 are made of such a diameter that they may be forced into the valve cap and retained in position by frictional engagement with the wall of the inside surfaces with which they contact.

Referring to Fig. 2 there is shown a construction in which the same form of packing is used in connection with a construction wherein a dust cap 7 is combined with a means for sealing the end of the valve stem and simultaneously providing for the retention and holding of the dust cap in its proper position.

The precise construction of the dust cap and the means within the same for attaching it to a valve stem form the subject matter of an application filed by Henry J. Hansen, and bearing Serial No. 435,103.

Within the dust cap 7 there is a member which is generally indicated at 8. This member has slots extending from the upper edge thereof through a portion of its length thereby rendering the upper part of the member 8 capable of expansion when force is applied to the same and the inherent springiness of the metal returning the upper part of the member 8 to its normal position when such pressure is removed.

The base portion of the member 8 is threaded as indicated at 8ª for the purpose of engaging with the threaded end or nipple 3 of the valve stem 2.

The member 8 is hollow and receives a solid member 9. This member 9 has a V-shaped ridge 10 and the inner wall of the member 8 has a V-shaped depression 11 which receives the ridge 10. The member 8 normally has a rather snug fit within the dust cap 7 but is free to move longitudinally with respect to the dust cap.

When the dust cap is introduced over the end of a valve stem, the threaded end of the valve stem will contact with the member 8 whereupon the dust cap is turned and the threaded portion 8ª of the member 8 turns upon the end of the valve stem.

As the dust cap 7 is turned the end 3 of the valve stem will engage with the packing members which will be presently described and the pressure applied will in turn be transmitted to the member 9, causing it to be raised and as the member 9 is raised the upper portions of the member 8 are expanded, thereby tightly gripping the inner wall of the dust cap 7 and frictionally holding the same against displacement.

It will thus be seen that the member 8 has the function of practically serving as an attachment between the dust cap and the valve stem, but additionally has the function of forming a cap or closure for the end of the valve stem and in this connection it is necessary to provide an efficient packing at the end of the valve stem to prevent the leakage of air in the event that the valve stem is slightly leaking.

Within the member 8 and beneath the member 9 are disks 12 and 13. The disk 12 is provided with a central opening 12ª while the disk 13 is imperforate. The disk 12 is formed of a relatively hard material such as fibre, while the disk 13 is formed of a relatively soft material, such as rubber, all as explained in connection with the previous disclosures of the invention.

When the member 8 is screwed onto the end of the valve stem, the end of the valve stem engages with the disk 12 and pressure is transmitted to the disk 13 which is compressed, thus forming a seal and preventing escape of air between the disks 12 and 13. At the same time the end of the valve stem engaging with the disk 12 will compress that disk sufficiently to prevent the escape of air between the end of the valve stem and the disk 12.

As before stated, the disk 12 is made of a material which is sufficiently hard so that on pressure the opening 12ª is not distorted materially, nor to such an extent that will engage with the protruding end of the stem of a valve insides but will leave that stem free.

Having described my invention, I claim:—

1. The combination with a member having a threaded opening and adapted to receive the threaded end of a valve stem, a relatively hard packing member above said threaded opening which packing member has a central opening and a relatively soft packing member above the relatively hard packing member.

2. The combination with a member having a threaded opening and a chamber above the threaded opening, a relatively hard packing member having a central opening, which packing member is located in the chamber above the threaded opening, and a relatively soft imperforate packing member which is above the relatively hard packing member.

3. The combination with a member having a closure at one end and a threaded opening at its opposite end and a chambered portion above the threaded opening, a disk of relatively hard material within said chamber, said disk having a central opening and another disk of relatively soft material which is imperforate bearing against the end closure and overlying the disk of relatively hard material.

In testimony whereof, I hereunto affix my signature.

ADELBERT E. BRONSON.